US011434380B2

(12) United States Patent
Chen et al.

(10) Patent No.: US 11,434,380 B2
(45) Date of Patent: Sep. 6, 2022

(54) AQUEOUS PRIMER COMPOSITION AND RELATED METHODS

(71) Applicant: 3M INNOVATIVE PROPERTIES COMPANY, St. Paul, MN (US)

(72) Inventors: Lianzhou Chen, Woodbury, MN (US); Jung-Sheng Wu, Woodbury, MN (US); Michael S. Newman, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/476,341

(22) PCT Filed: Mar. 22, 2018

(86) PCT No.: PCT/US2018/023781
§ 371 (c)(1),
(2) Date: Jul. 8, 2019

(87) PCT Pub. No.: WO2018/175730
PCT Pub. Date: Sep. 27, 2018

(65) Prior Publication Data
US 2020/0040196 A1 Feb. 6, 2020

Related U.S. Application Data

(60) Provisional application No. 62/476,272, filed on Mar. 24, 2017.

(51) Int. Cl.
*C09D 5/00* (2006.01)
*C09D 7/61* (2018.01)
*C09D 7/20* (2018.01)
*C09D 5/08* (2006.01)
*C09D 163/00* (2006.01)
*C08K 3/36* (2006.01)
*C08K 3/32* (2006.01)

(52) U.S. Cl.
CPC ............ *C09D 5/002* (2013.01); *C09D 5/084* (2013.01); *C09D 7/20* (2018.01); *C09D 7/61* (2018.01); *C09D 163/00* (2013.01); *C08K 3/36* (2013.01); *C08K 2003/328* (2013.01)

(58) Field of Classification Search
CPC .................. C09D 163/00–10; C09D 5/002
See application file for complete search history.

(56) References Cited

U.S. PATENT DOCUMENTS

| 3,294,748 A * | 12/1966 | Rogers, Jr. ......... C08G 59/4035 528/120 |
| 3,417,064 A | 12/1968 | Bailey, Jr. |
| 4,100,140 A | 7/1978 | Zahir |
| 4,355,122 A | 10/1982 | Fan |
| 4,638,038 A | 1/1987 | Salensky |
| 5,641,818 A | 6/1997 | Sweet |
| 5,767,176 A | 6/1998 | Nakanishi |
| 6,475,621 B1 | 11/2002 | Kohli |
| 9,394,433 B2 | 7/2016 | Thompson |
| 9,512,336 B2 | 12/2016 | Zhao |
| 2003/0116269 A1* | 6/2003 | Kohli .................. C08L 2666/28 156/307.1 |
| 2015/0094400 A1* | 4/2015 | Zheng ..................... C08L 63/00 252/182.13 |
| 2015/0096680 A1* | 4/2015 | Zhao ....................... C09D 7/63 156/330 |
| 2017/0081465 A1* | 3/2017 | Burton ............... C08G 65/2624 |

FOREIGN PATENT DOCUMENTS

| CN | 104673036 A | * 6/2015 |
| JP | 11293092 A | * 10/1999 |
| WO | WO 2009-086515 | 7/2009 |

OTHER PUBLICATIONS

Machine Translation of CN104673036A. Jun. 3, 2015. (Year: 2015).*
Epikure 6870-W-53 Technical Data Sheet. Hexion. Mar. 1, 2018. (Year: 2018).*
CoatOSil 1770 Silane Technical Data Sheet. Momentive. Sep. 17, 2020. (Year: 2020).*
Sigma-Aldrich. 4,4'-Diaminodiphenyl sulfone information. https://www.sigmaaldrich.com/US/en/product/mm/821073. As viewed on Aug. 20, 2021. (Year: 2021).*
European Chemicals Agency. Isophthalohydrazide Water Solubility Data. As viewed on Aug. 20, 2021. (Year: 2021).*
Machine Translation of JPH11-293092A. Oct. 26, 1999. (Year: 1999).*
4,4'-diaminodicyclohexylmethane Information. PubChem. https://pubchem.ncbi.nlm.nih.gov/compound/4_4_-Methylenedicyclohexanamine. As viewed on Feb. 24, 2022. (Year: 2022).*
Watkins, "Formulating High-Performance Waterborne Epoxy Coatings", Thermoset Resin Formulators Association Annual Meeting, Canada, Sep. 11-12, 2006, 28 pages, XP002781418.
International Search Report for PCT International Application No. PCT/US2018/023781, dated Jun. 7, 2018, 4 pages.

* cited by examiner

*Primary Examiner* — Stephen E Rieth
(74) *Attorney, Agent, or Firm* — Philip P. Soo

(57) ABSTRACT

Provided are aqueous primer compositions and methods that can be useful for protecting primary structures on an aircraft. The primer composition can contain a thermosetting resin dispersion in water, a coalescent solvent in which the thermosetting resin is at least partially soluble, a first curative that is substantially water-insoluble, and a second curative that is substantially water-soluble. Optionally, the primer composition further contains an epoxy silane, where the primer composition is substantially free of any liquid or water-soluble curatives containing a primary or secondary amine group.

21 Claims, No Drawings

AQUEOUS PRIMER COMPOSITION AND RELATED METHODS

CROSS REFERENCE TO RELATED APPLICATIONS

This application is a national stage filing under 35 U.S.C. 371 of PCT/US2018/023781, filed Mar. 22, 2018 which claims the benefit of U.S. Provisional Patent Application No. 62/476,272, filed Mar. 24, 2017, the disclosures of which is incorporated by reference in its/their entirety herein.

FIELD OF THE INVENTION

Provided are aqueous primer compositions useful for protecting a substrate from corrosion. The provided primer compositions can be used for protecting primary structures on an aircraft.

BACKGROUND

Manufacturers of airplanes and rotorcrafts go to great lengths to ensure the long-term durability of their aircraft. With many aircraft structures made from metal, protecting these parts from corrosion is a foremost concern. Corrosion is the deterioration of metal by chemical or electrochemical attack, whereby the metal is converted into a metallic compound such as an oxide, hydroxide or sulfate. Chemical corrosion can be caused by exposure to caustic cleaning agents, while electrochemical corrosion can be induced by exposure to conductive liquids such as salt water.

One way to protect against corrosion is to apply a primer coating (or film) that acts as a barrier layer on the surfaces of vulnerable metal structures. For added protection, it is common to add corrosion inhibitors to such primer films. Conventionally, corrosion inhibitors for aluminum alloys are derived from hexavalent-chromium compounds, which are used in both surface preparation and organic primer compositions. These chromium compounds generally include chromates, which are salts with an anion containing chromium and oxygen, such as $CrO_4^{2-}$.

While chromates can inhibit corrosion, these compositions are becoming increasingly disfavored because of environmental, health, and safety concerns. Evolving regulatory regimes have caused manufacturers to explore use of fundamentally new primer systems capable of meeting new regulatory standards.

SUMMARY

Amid concerns related to use of chromium and its compounds, pre-treatments and primers free of these chemistries have been explored by industrial manufacturers. Efforts in developing non-chromated systems have focused on both replacement of the chromate conversion coating with a non-chromated surface preparation as well as replacement of the chromated epoxy primer system with a non-chromated system.

With respect to the latter, certain non-chromated primer systems are based on water-based compositions. While these compositions are low in volatile organic compounds (VOCs) and thus desirable for environmental reasons, many do not afford the same levels of corrosion resistance as their solvent-based counterparts. When epoxy resins are dispersed in water, solid epoxy resin particles can undergo sedimentation, where these particles stack upon each other as the water evaporates. If these resins are used in combination with solid curatives in the primer formulation, the inhomogeneous nature of the epoxy and curative can significantly decrease the corrosion resistance of the cured primer.

It was discovered that blending both soluble and insoluble epoxy curatives can provide a solution to this technical problem. This not only improves the homogenous of the cured thermoset system, but also does not significantly impair the low water absorption properties brought by the insoluble solid curatives. By balancing these curatives, it was possible to achieve a superior primer system.

Further, the average particle sizes of the thermosetting resin and associated curative was observed to influence the performance of the cured final product as a protective layer on a substrate. Commercially available curatives, such as epoxy curatives, tend to have an average particle size well above the optimal range. While such particles can be reduced in size using traditional grinding methods such as jet milling, ball milling, or sand milling, it is difficult to get a small particle size comparable to that of the thermosetting resin dispersion. Disclosed herein are methods of milling the curatives for the thermoset resins to fine particles without need for added surfactants.

In sum, the provided primer compositions can have particle sizes that increase solvent resistance, mechanical performance and salt spray corrosion resistance of the cured primer, and further overcome technical difficulties associated with prior art methods and achieve performance that compare favorably with those of solvent based primer systems.

In one aspect, a primer composition is provided. The primer composition comprises: a thermosetting resin dispersion in water; a coalescent solvent in which the thermosetting resin is at least partially soluble; a first curative that is substantially water-insoluble; and a second curative that is substantially water-soluble.

In a second aspect, a primer composition is provided, comprising: an epoxy resin dispersion in water; a coalescent solvent in which the epoxy resin is at least partially soluble; an epoxy silane; a first curative that is substantially water-insoluble; and optionally, a second curative that is substantially water-soluble, wherein the primer composition is substantially free of any liquid or water-soluble curatives containing a primary or secondary amine group.

In a third aspect, a method of making a primer composition is provided, comprising: milling an aqueous mixture to obtain a precursor dispersion, the aqueous mixture comprising: a thermosetting resin dispersion in water; a coalescent solvent in which the thermosetting resin is at least partially soluble; and a first curative that is substantially water-insoluble; and mixing the precursor dispersion with a second curative that is substantially water-soluble to obtain the primer composition.

In further aspects, cured primer films and primed articles based on the aforementioned primer compositions are herein provided.

Definitions

As used herein:

"ambient conditions" means at a temperature of 25° C. and a pressure of 1 atmosphere (i.e., 101.3 kPa);

"ambient temperature" refers to a temperature of 25° C.;

"average" refers to a number average;

"cure" refers to chemically crosslinking, such as by exposing to radiation in any form, heating, or allowing to undergo a chemical reaction that results in hardening or an increase in viscosity (e.g., under room temperature or heated conditions);

"polymer" refers to a molecule having at least one repeating unit and can include copolymers;

"solvent" refers to a liquid capable of dissolving a solid, liquid, or gas, such as silicones, organic compounds, water, alcohols, ionic liquids, and supercritical fluid;

"substantially" refers to a majority of, or mostly, as in an amount of at least 50%, 60, 70, 80, 90, 95, 96, 97, 98, 99, 99.5, 99.9, 99.99, or 99.999%, or 100% of a composition based on weight or volume;

"substantially free of" means having a trivial amount of, such that a composition is 0 wt % to 5 wt % of a given component, or 0 wt % to 1 wt %, or 5 wt % or less than, equal to, or greater than 4.5 wt %, 4, 3.5, 3, 2.5, 2, 1.5, 1, 0.9, 0.8, 0.7, 0.6, 0.5, 0.4, 0.3, 0.2, 0.1, 0.01, or 0.001 wt %, or 0 wt % of the component; and "substituted" refers to the state in which one or more hydrogen atoms contained therein are replaced by one or more non-hydrogen atoms.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

The terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference.

In the methods described herein, the acts can be carried out in any order, except when a temporal or operational sequence is explicitly recited. Furthermore, specified acts can be carried out concurrently unless explicit claim language indicates that they be carried out separately. For example, two different claimed steps may be performed simultaneously within a single operation, and the resulting process will fall within the literal scope of the claimed process.

Primer Compositions

The disclosed primer compositions can be used to protect a surface against corrosion, promote adhesion, and enhance bond durability in operating conditions. In aerospace applications, such operating conditions include exposure to salt, moisture and wide thermal fluctuations.

The primer compositions can be disposed onto any of a number of possible substrates. Substrates commonly encountered in the aircraft industry include aluminum, aluminum cladding, titanium, and fiber-reinforced composites. The range of potential substrates, however, need not be so limited. In alternative applications, for example, the primer compositions can be applied to painted substrates, thermoplastic substrates, electroplated metal substrates, and metal substrates in general.

Exemplary primer compositions are aqueous primers based on a curable resin dispersed in water. As used herein, the terms "dispersed" and "dispersion" refer to finely divided particles of a liquid or solid first component disposed in a liquid second component. Where the first and second components are both liquids, the dispersion can be referred to as an emulsion.

Advantageously, the provided primer compositions can be formulated to be substantially or totally free of chromium and chromium compounds.

In various embodiments, the primer composition is an aqueous dispersion. The aqueous dispersion includes a thermosetting resin dispersion in water, a coalescent solvent, and at least two curatives that are different from each other. The two curatives can include a first curative that is substantially water-insoluble and, optionally, a second curative that is substantially water-soluble.

In some embodiments, the primer composition is an aqueous dispersion having a dispersed phase representing from 5 wt % to 40 wt % based on the overall weight of the primer composition, and a continuous aqueous phase representing from 60 wt % to 95 wt % based on the overall weight of the primer composition. The dispersed phase may include two or more thermosetting resins. For example, the dispersed phase may include a mixture of particles of different resins or, alternatively, may include one type of particle where each particle contains two or more thermosetting resins.

Particular components of the aqueous dispersion are described in more detail below.

At ambient temperature, the thermosetting resin is at least partially insoluble in water. The thermosetting resin may be a liquid or solid at ambient temperature.

Useful thermosetting resins include epoxy, bismaleimide, phenolic and unsaturated polyester resins. In some embodiments, the thermosetting resin can include a mixture of two or more of the aforementioned resins. Suitable epoxy resins include conventional epoxy resins having an average functionality of at least 1.5, 1.6, 1.7, 1.8, 1.9, 2, or more. In some embodiments, the epoxy resin contains substantially no ionic or ester groups. Epoxy resins can be chain-extended, glycidyl ethers of phenols, such as resorcinol and the bisphenols, e.g., bisphenol A and bisphenol F. Also suitable are solid glycidyl derivatives of aromatic amines and aminophenols, such as N,N,N',N'-tetraglycidyl-4,4'-diaminodiphenylmethane. Other useful epoxy resins include solid novolac epoxy resins and solid diglycidyl ethers of bisphenol A ("DGEBA") resins.

Commercially available epoxy resins include EPON SU-8, a polymeric epoxy resin with an average functionality of 8, melting point of 82° C., and an epoxy equivalent weight of 215 g/mol, from Hexion, Inc., Columbus, Ohio; DER 669, a high molecular weight solid epoxy resin having a softening point of 135-155° C. and an epoxy equivalent weight of 3500-5500 g/mol from the Dow Chemical Company; EPON 1002, a solid DGEBA epoxy having an epoxy equivalent weight of 550-650 g/mol and a melting point of from 75-85° C., also from Hexion, Inc., Columbus, Ohio; and ARALDITE ECN 1273, 1280, and 1299 novolac solid epoxy resins having epoxy functionalities from 3.8 to 5.4, epoxy equivalent weights of from 225-235 g/mol, and melting points of from 73-99° C., from Huntsman Corporation, The Woodlands, Tex.

Representative epoxy comonomer resins are disclosed in the treatise Handbook of Epoxy Resins, McGraw-Hill, Inc., 1967. Examples of such resins include bisglycidyl ethers of bisphenols, such as bisphenol A, bisphenol F, and bisphenol S. Also suitable are the various phenolic and cresolic novolac-type resins, as well as the venous glycidoxy amines and aminophenols, particularly N,N,N',N'-tetrakis(glycidyl)-4,4-diaminodiphenyl methane and N,N,O-tris(glycidyl)-4-aminophenol. Epoxy resins based on the glycidyl ethers of the various dihydroxy-naphthalenes and phenolated dicyclopentadienes are also suitable.

Useful phenolic resins include novolac type phenolic resins, where the ratio of o-methylene to p-methylene bond is up to 1 and/or a resole type phenolic resin. Mixtures of novolac type and resole type phenolic resins may be used.

In some embodiments, the epoxy resin is provided in solid, particulate form. In other embodiments, the epoxy resin is provided as an aqueous dispersion. For example, ARALDITE ECN-1299 is supplied as an aqueous dispersion from Huntsman Corporation, The Woodlands, Tex. as ARALDITE ECN-1440. In some embodiments, the aqueous dispersion can further contain one or more surfactants that help provide a uniform dispersion of the resin and minimize settling. Such surfactants may be ionic or non-ionic in nature.

Bismaleimide resins are also well known, and include the N,N'-bismaleimides of 1,2-ethanediamine, 1,6-hexanediamine, trimethyl-1,6-hexanediamine, 1,4-benzenediamine, 4,4'-methylenebisbenzenamine, 2-methyl-1,4-benzenediamine, 3,3'-methylenebisbenzenamine, 3,3'-sulfonylbisbenzenamine, 4,4'-sulfonylbisbenzenamine, 3,3'-oxybisbenzenamine, 4,4'-oxybisbenzenamine, 4,4'-methylenebiscyclohexanamine, 1,3-benzenedimethanamine, 1,4-benzenedimethanamine, 4,4'-cyclohexanebisbenzenamine, and mixtures thereof.

In some embodiments, bismaleimide resins are derived from toluenediamine, methylenedianiline, aliphatic diamines, and isophorone diamine. Bismaleimide monomers are generally prepared by reacting maleic anhydride, or substituted maleic anhydride, with a suitable diamine. Both aromatic and aliphatic diamines can be used to prepare bismaleimide. Aromatic diamines include phenylenediamine, diaminodiphenylsulfones, diaminodiphenylisopropylidenes, diaminodiphenylketones, diaminodiphenyloxides and diaminodiphenylsulfides.

Co-reactants for use with the bismaleimides can include any of a number of unsaturated organic compounds. Examples include (meth)acrylic acid and (meth)acrylamide and derivatives thereof, e.g., (methyl)methacrylate; dicyanoethylene; tetracyanoethylene; allyl alcohol; 2,2'-diallylbisphenol A; 2,2'-dipropenylbisphenol A; diallylphthalate; triallylisocyanurate; triallylcyanurate; N-vinyl-2-pyrrolidinone; N-vinyl caprolactam; ethylene glycol dimethacrylate; diethylene glycol dimethacrylate; trimethylolpropane triacrylate; trimethylolpropane trimethacrylate; pentaerythritol tetramethacrylate; 4-allyl-2-methoxyphenol; triallyl trimellitate; divinyl benzene; dicyclopentadienyl acrylate; dicyclopentadienyloxyethyl acrylate; 1,4-butanediol divinyl ether; 1,4-dihydroxy-2-butene; styrene; a-methyl styrene; chlorostyrene; p-phenylstyrene; p-methylstyrene; t-butylstyrene; and phenyl vinyl ether.

In some embodiments, a bismaleimide is used in combination with a bis(alkenylphenol), as described in U.S. Pat. No. 4,100,140 (Zahir et al.). Such combinations could include, for example, 4,4'-bismaleimidodiphenylmethane and o,o'-diallyl bisphenol A.

In some embodiments, thermoplastic phenoxy resins are added as modifiers or tougheners in the provided compositions. These can be of the waterborne type, and may be prepared by methods described in U.S. Pat. No. 4,355,122 (Fan) and U.S. Pat. No. 4,638,038 (Salensky).

Water soluble polyether polymers suitable for use as modifiers include poly(ethylene oxide) and poly(vinylmethylether) polymers. Poly(ethylene oxide) polymers are commercially available, and can also be prepared by methods known in the art such as described in U.S. Pat. No. 3,417,064 (Bailey).

Dispersions of thermosetting resins, such as dispersed epoxies, can be advantageously used as co-reactants or modifiers in the provided primer compositions. Suitable emulsified epoxies include, for example, EPI-REZ 3510-W-60, EPI-REZ 3515-W-60, EPON Resin 1007 in water and methoxy propanol, and EPI-REZ DPW-5108, from Hexion, Inc., Columbus, Ohio, and ARALDITE PZ 323 from Huntsman Corporation, The Woodlands, Tex.

Further aspects of epoxy and bismaleimide resins are described in U.S. Pat. No. 6,475,621 (Kohli et al.) and U.S. Pat. No. 9,394,433 (Thompson et al.).

Where the thermosetting resin takes the form of a solid particulate, the solid particulate can have a number average diameter of from 0.3 micrometers to 100 micrometers, from 0.4 micrometers to 50 micrometers, from 0.5 micrometers to 10 micrometers, or in some embodiments, less than, equal to, or more than 0.3 micrometers, 0.4, 0.5, 0.7, 1, 2, 3, 4, 5, 6, 7, 8, 9, 10, 12, 15, 17, 20, 25, 30, 35, 40, 45, 50, 55, 60, 65, 70, 75, 80, 85, 90, 95, or 100 micrometers.

In the provided primer compositions, the coalescent solvent serves the purpose of facilitating film formation from polymeric binder particles. The film formation process in resin dispersions involves the coalescence of the polymeric particles, during and after the evaporation of the water, thereby permitting contact and fusion of adjacent polymeric dispersion particles.

Preferably, the coalescent solvent partially or fully dissolves the thermosetting resin. Chemical compatibility between the two components enables the coalescing solvent to act as a temporary plasticizer for the dispersed particles of the thermosetting resin. This in turn enables particle deformation and reduces the minimum temperature at which a film can be formed. Advantageously, coalescing agents can enable formation of polymeric films at ambient temperature, even when the dispersion polymers have a glass transition temperature well above the temperature at which film application occurs.

In some embodiments, introduction of the coalescing solvent into the primer composition causes one or more of following effects: (1) lowering the glass transition temperature ("$T_g$") of the polymer particles; (2) reducing polymer particle surface area; (3) increasing capillary forces by controlled evaporation of water; and (4) reducing repulsive forces between dispersed particles.

In some embodiments, the coalescent solvent also partially or fully dissolves the water-insoluble curative. This property of the coalescent solvent can promote dispersion of the water-insoluble curative into the dispersed particles of thermosetting resin or thermosetting resin mixture, and provide a more uniform cure.

In an aqueous primer composition, it is preferable for the coalescing solvent to have an evaporation rate less than that of water but high enough to allow for proper film formation under a wide range of temperature and humidity conditions.

The evaporation should be high enough that the coalescent solvent can be expunged from the primer film after application and curing.

In some embodiments, the primer composition includes two different coalescent solvents. It can be beneficial for different coalescent solvents to be introduced at different respective stages of preparation of the primer composition. For example, a first coalescent solvent can be present in a precursor dispersion of the thermosetting resin, which is milled along with other water-insoluble components, and later mixed with a second coalescent solvent.

Exemplary coalescent solvents for the provided primer compositions can include one or more glycol mono ethers. Suitable glycol mono ethers include propylene glycol mono-ether, ethylene glycol mono-ether, and butylene glycol mono-ether.

The coalescent solvent can be present in an amount of from 0.1 wt % to 30 wt %, from 1 wt % to 20 wt %, from 5 wt % to 10 wt %, or in some embodiments, less than, equal to, or more than 0.1%, 0.2, 0.5, 0.7, 1, 1.5, 2, 2.5, 3, 4, 5, 6, 7, 8, 9, 10, 12, 15, 17, 20, 22, 25, 26, 27, 28, 29, 30, 31, 32, 33, 34, 35, 36, 37, 38, 39 or 40%, based on the overall weight of the primer composition.

The provided primer compositions can include at least two curatives, where one curative is substantially water-insoluble and the other curative is substantially water-soluble.

The water-insoluble curative can be completely or at least substantially insoluble at ambient temperature. In some embodiments, the water-insoluble curative is a solid at ambient temperature. In some embodiments, the water-insoluble curative is present as a particulate solid dispersed in an aqueous dispersion. Such curative may in some instances be soluble in other solvents present in the primer composition, such as the coalescent solvent.

Suitable water-insoluble curatives include aromatic amines and mixtures thereof. Exemplary aromatic amines include 4,4'-diaminodiphenylmethane, 2,2-bis(4-[4-aminophenoxy]phenyl)propane, 3,3'- and 4,4'-diaminodiphenylsulfone, 3,3'- and 4,4'-diaminodiphenyloxide, 3,3- and 4,4'-diaminodiphenyloxide, 3,31'- and 4,4'-diaminodiphenyl sulfide, and 3,3'- and 4,4'-diaminodiphenylketone.

Other suitable solid diamine curatives include 2,4-toluenediamine, 1,4-phenylenediamine, 2,2-bis(4-aminophenyl) hexafluoro propane, 2,2-bis(3-amino-4-hydroxyphenyl) hexafluoro propane, 3,4'-diaminodiphenyloxide, 9,9-bis(4-aminophenyl)fluorene, o-toluidine sulfone, and 4,4'-diaminobenzanilide. Particularly preferred are 9,10-bis(4-aminophenyl)anthracene, 2,2-bis(4-[3-aminophenoxy] phenyl)sulfone, 2,2-bis(4-[4-aminophenoxy]phenyl) sulfone, 1,4-bis(4-aminophenoxy)biphenyl, bis(4-[4-aminophenoxy)phenyl) ether, and 2,2-bis([4-(4-amino-2-trifluorophenoxy)]phenyl)hexafluoropropane.

Preferred aromatic amines include 2,2-bis-[4-(4-aminophenoxy)-phenyl]propane, 2,2'-diaminodiphenyl sulfone, 4,4'-diaminodiphenyl sulfone, and mixtures thereof. Further options and advantages concerning the aforementioned curatives can be found in U.S. Pat. No. 6,475,621 (Kohli et al.).

The water-insoluble curative can be present in an amount of from 0.5 wt % to 40 wt %, from 5 wt % to 30 wt %, from 10 wt % to 20 wt %, or in some embodiments, less than, equal to, or more than 0.5%, 0.6, 0.7, 0.8, 0.9, 1, 1.5, 2, 2.5, 3, 4, 5, 6, 7, 8, 9, 10, 12, 15, 17, 20, 22, 25, 26, 27, 28, 29, 30, 31, 32, 33, 34, 35, 36, 37, 38, 39, or 40%, based on the solids weight of the primer composition.

The provided primer compositions can further include a second curative that is at completely or at least substantially water-soluble at ambient temperature. It was discovered, surprisingly, that the addition of a second, water-soluble curative can help overcome a technical problem when relying on water-insoluble curatives alone to cure the primer composition.

During the primer film-forming process from aqueous dispersions, particles of thermosetting resin tend to stack as the water evaporates. When solid curatives are used, the curative and thermosetting resin represent a heterogenous mixture, which can result in non-uniform curing and suboptimal chemical and corrosion resistance of the cured primer composition. Use of a water-soluble curative can alleviate this problem by allowing the curative to permeate into the stacked particles.

In addition to the above, there is a countervailing effect attributable to the hygroscopic nature of the water-soluble curative. Because water-soluble curatives have the tendency to absorb water, their residue can reduce the primer's moisture resistance, as well as its degree of corrosion protection, when cured. The provided compositions use a combination of water-insoluble and water-soluble curatives to overcome this dilemma, achieving the benefits of a uniform primer film that is also sufficiently hydrophobic to resist moisture uptake after curing.

Water-soluble curatives include isophthaloyl dihydrazide (also known as isophthalohydrazide, m-phthalic dihydrazide, m-phthaloyldihydrazide, isophthaloyl hydrazide, isophthalic dihydrazide, isophthaloylbishydrazine, isophthalic acid dihydrazide, 1,3-bis(hydrazinocarbonyl)benzene, and 1,3-benzene dicarboxylic acid dihydrazide), dicyandiamide (also known as cyanoguanidine, N-cyanoguanidine, 1-cyanoguanidine, guanidine-1-carbonitrile, dicyandiamin, didin, DCD, and DICY), terephthalic dihydrazide (also known as benzene-1,4-dicarboxylic acid dihydrazide), and adipic acid dihydrazide. In some embodiments, the water-soluble curative contains a blend of isophthaloyl dihydrazide and dicyandiamide.

The water-soluble curative can be present in an amount of from 0.01 wt % to 20 wt %, from 0.1 wt % to 15 wt %, from 1 wt % to 10 wt %, or in some embodiments, less than, equal to, or more than 0.01%, 0.02, 0.05, 0.07, 0.1, 0.2, 0.5, 0.7, 1, 1.5, 2, 2.5, 3, 4, 5, 6, 7, 8, 9, 10, 12, 15, 17, or 20%, based on the overall solids weight of the primer composition.

Optionally, the primer composition can further include one or more catalysts. A catalyst may be used when the curatives above are not alone sufficient to provide an adequate cure of the primer composition under normal curing conditions.

In some embodiments, the catalyst is a solid compound under ambient conditions. In some embodiments, the catalyst is dispersible in water. The catalyst may be either soluble, insoluble, or partially soluble in water. Known catalysts for epoxy resins include, for example, monourea, bisurea, blocked imidazole, substituted imidazole blocked amine such as an amine/epoxy adduct, hydrazine, and combinations thereof.

The primer composition may further include one or more adhesion promoters to enhance bonding to metal substrates. Suitable adhesion promoters include epoxy silanes. Useful epoxy silanes include those having the formula:

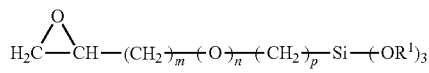

wherein m ranges from 1 to 6, n is 0 or 1, p ranges from 1 to 6, and $R^1$ is H or an alkyl group of 1 to 10 carbon atoms (including an alkyl group of 1 to 4 carbon atoms). Included amongst these epoxy silanes is, for example, a bifunctional silane containing a glycidoxy reactive group and a trimethoxy-silyl inorganic group. Further exemplary epoxy silanes are described in International Patent Application No. WO 2009/086515 (Chang et al.).

In some embodiments, the primer composition is substantially free of any liquid or water-soluble curatives that contain a primary or secondary amine group. In some embodiments, the primer composition is substantially free of any liquid or water-soluble curatives that contain an amine group generally.

In conventional primer compositions that contain a soluble or semi-soluble amine capable of reacting with the epoxy resins, the above problem is remedied by adding a buffering agent such as propylene carbonate. These buffering agents can help maintain a neutral pH (i.e. pH~7±0.5) and form secondary bonds with curatives and/or catalysts in the primer to stabilize the emulsion. Elevated temperatures, however, can be problematic during storage or transport. Such temperatures can disrupt these secondary bonds and liberate the reactive amine groups, leading to premature curing and poor shelf stability.

In some embodiments, the provided primer compositions contain an epoxy silane, are substantially free of liquid or water-soluble curatives containing a primary or secondary amine group, and are substantially free of buffering agents such as propylene carbonate. Advantageously, the absence of reactive amines in the emulsified components enhances the stability of the provided primer composition at high temperatures, including temperatures exceeding 80° C., 90° C., or even 100° C.

To assist in the film-forming process, it can be beneficial for the primer composition to further include a carrier solvent. The carrier solvent is generally a volatile solvent that forms an azeotrope with water and can accelerate evaporation when the primer composition is applied to a substrate.

Suitable carrier solvents can include any solvent miscible with water. In some instances, the carrier solvent is also miscible with one or more of the thermosetting resins. Some carrier solvents have a flash point below ambient temperature. In some embodiments, the flash point of the carrier solvent can be up to −20° C., −15° C., −10° C., −5° C., 0° C., 5° C., 10° C., 15° C., or 20° C. at ambient pressure. The carrier solvent can include one or more of methyl alcohol, ethyl alcohol, isopropyl alcohol, acetone, methyl ether ketone, methyl propyl ketone, methyl isopropyl ketone, and methyl isobutyl ketone.

The carrier solvent can be present in an amount of from 0.1 wt % to 30 wt %, from 0.5 wt % to 15 wt %, from 1 wt % to 10 wt %, or in some embodiments, less than, equal to, or greater than 0.1 wt %, 0.2, 0.5, 0.7, 1, 1.5, 2, 2.5, 3, 4, 5, 6, 7, 8, 9, 10, 12, 15, 17, 20, 22, 25, 26, 27, 28, 29, or 30 wt %, based on the overall weight of the primer composition.

The composition may further contain any of a number of dyes, pigments, fillers, leveling agents, additional dispersing agents, thickeners, and corrosion inhibitors known in the art.

As explained previously, corrosion inhibition can be an important function of the primer. This is especially the case in aerospace applications, where primed surfaces can be exposed to humid environments, salt water from the ocean, and thermal cycling. This property can be substantially enhanced by adding a corrosion inhibitor.

A corrosion inhibitor can be a chromate-based corrosion inhibitor or, alternatively, a non-chromate corrosion inhibitor that is substantially free of chromium and chromium compounds.

Chromate-based corrosion inhibitors include strontium chromate, barium chromate, zinc chromate, and calcium chromate, and combinations thereof.

Non-chromate corrosion inhibitors include strontium aluminum polyphosphate hydrate, zinc phosphate, and zinc aluminum polyphosphate hydrate, and combinations thereof.

Corrosion inhibitors can be present in an amount of from 0.1 wt % to 30 wt %, from 2 wt % to 25 wt %, from 4 wt % to 20 wt %, or in some embodiments, less than, equal to, or greater than 0.1 wt %, 0.2, 0.5, 0.7, 1, 1.5, 2, 2.5, 3, 4, 5, 6, 7, 8, 9, 10, 12, 15, 17, 20, 22, 25, 26, 27, 28, 29, or 30 wt %, based on the overall solids weight of the primer composition.

The primer composition can further include an inorganic filler. The inorganic filler is not particularly restricted. One preferred inorganic filler is fumed silica. Fumed silica is used as thickening agent to increase the viscosity of the primer composition when it is applied to the surface of the substrate to be protected.

In some embodiments, the inorganic filler is present in an amount of from 0.01 wt % to 15 wt %, from 0.3 wt % to 10 wt %, from 1 wt % to 5 wt %, or in some embodiments, less than, equal to, or more than 0.01 wt %, 0.02, 0.03, 0.04, 0.05, 0.07, 0.08, 0.09, 0.1, 0.2, 0.3, 0.4, 0.5, 0.7, 1, 1.5, 2, 2.5, 3, 4, 5, 6, 7, 8, 9, 10, 11, 12, 13, 14, 15, 16, 17, 18, 19, or 20 wt %, based on the overall solids weight of the primer composition.

Methods of Making

The provided primer compositions can be made by first mixing the thermosetting resin(s) into water or aqueous solution to form a dispersion. This dispersion can be combined with other particulate components such as water-insoluble curatives to afford an aqueous dispersion that is subsequently ground to provide a precursor composition. Useful grinding methods include ball milling, sand milling, and air jet milling. Remaining liquid and water-soluble components can then be added to the precursor composition to obtain the curable primer composition.

The above processes were found to be advantageous because reducing particle size can improve dispersibility of both the thermosetting resin and curative systems and mitigate the effects of sedimentation. Use of micronized (i.e., micrometer scale) particles was also found to improve homogeneity, solvent resistance, mechanical performance, and moisture resistance of the cured primer film.

A further advantage to the disclosed methods is the reduced need to introduce additional surfactants to the primer composition to obtain the micronized particles. The disclosed methods use the surfactants already found in the epoxy resin dispersion. By reducing the amount of added surfactant, the cured primer can be made less hydrophilic and thus more resistant to moisture penetration after curing.

In an exemplary method of making a primer composition, an aqueous mixture is milled to obtain a precursor dispersion. The aqueous mixture contains an epoxy resin dispersion in water, a coalescent solvent in which the thermosetting resin is at least partially soluble, and a first curative that is substantially water-insoluble. This precursor dispersion is then mixed with a second curative that is substantially water-soluble until a uniform primer composition is obtained.

In some embodiments, no surfactants are added beyond those surfactants present in the epoxy resin dispersion prior to its mixing with the coalescent solvent and the first curative.

Other additives such as dyes, pigments, corrosion inhibitors, and additional coalescent solvents, were previously discussed. These additives may be introduced prior to, simultaneously with, or after the addition of the second curative to the precursor composition.

Representative grinding mills use agitating beads as grinding media, which are housed within a coolable grinding chamber. Either continuous or batch operations may be used. In some embodiments, the grinding media are based on a high-density, high-hardness material such as zirconium oxide or zirconium silicate. Commonly, the grinding media are spherical. The diameter of the grinding media is not restricted, but typically is in a range of from 0.05 mm to 2 mm, 0.1 mm to 1.8 mm, 0.6 mm to 1.5 mm, or in some embodiments, less than, equal to, or greater than 0.05 mm, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 mm.

The provided methods are capable of reducing the particle size of the thermosetting resin system and/or curatives to an average particle size of from 0.5 micrometers to 10 micrometers, from 0.7 micrometers to 5 micrometers, from 1 micrometer to 3 micrometers, or in some embodiments, less than, equal to, or greater than, 0.5 micrometers, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.7, 3, 3.2, 3.4, 3.6, 3.8, 4, 4.5, 5, 5.5, 6, 6.5, 7, 7.5, 8, 8.5, 9, 9.5, or 10 micrometers.

The resulting particle size distribution of the thermosetting resin system and curative may be monomodal, bimodal, or multimodal in general. A bimodal particle size distribution may result, for example, when the thermosetting resin particles have a mean diameter that is smaller than that of the curative particles.

Methods of Use

The provided primer compositions can be disposed onto a substrate using any known method. Suitable methods include application by brush, by roller, dipping, drenching, or by traditional spraying and drying methods.

In representative embodiments, the substrate to which the primer is applied is a primary aircraft component. The primary aircraft component may have a metallic outer surface made from, for example, aluminum, titanium, or alloys thereof.

In some embodiments, the provided primer compositions may be coated onto the substrate with basic cleaning steps, and without need for surface pre-treatment.

If desired, however, the metallic surface may undergo certain surface preparation steps to obtain a clean and dry surface that is free of grease or other contaminants prior to application of the primer composition. Suitable cleaning methods may produce a break-free water film on metal surfaces. According to one method, the surface is chemically provided with a roughened surface for bonding. This may be realized, for example, by etching the metal surface using a mixture of sodium dichromate and sulfuric acid, optionally followed by an anodizing process.

Following application, the primer composition can be dried at ambient temperature and then cured at an elevated temperature to provide a primed article. In one embodiment, the initial air drying step occurs at ambient temperature for at least 15 minutes, at least 20 minutes, at least 30 minutes or at least 45 minutes, or until a tack-free primer coating is obtained. The curing step can occur, for example, at temperatures of from 80° C. to 180° C., 100° C. to 135° C., or from 110° C. to 130° C. In aerospace primer embodiments, it can be advantageous to cure at temperatures on the lower end of the aforementioned ranges to obtain a better co-cure with film adhesives.

Further embodiments of the provided compositions and methods are enumerated as follows:

1. A primer composition comprising: a thermosetting resin dispersion in water; a coalescent solvent in which the thermosetting resin is at least partially soluble; a first curative that is substantially water-insoluble; and a second curative that is substantially water-soluble.
2. A primer composition comprising:
   an epoxy resin dispersion in water; a coalescent solvent in which the epoxy resin is at least partially soluble; an epoxy silane; a first curative that is substantially water-insoluble; and optionally, a second curative that is substantially water-soluble, wherein the primer composition is substantially free of any liquid or water-soluble curatives containing a primary or secondary amine group.
3. The primer composition of embodiment 1, further comprising a catalyst comprising one or more of a monourea, bisurea, blocked imidazole, substituted imidazole blocked amine such as an amine/epoxy adduct, and hydrazine.
4. The primer composition of any one of embodiments 1-3, wherein the composition is substantially free of chromium and/or chromium compounds.
5. The primer composition of embodiment 1 or 3, wherein the thermosetting resin comprises an epoxy resin.
6. The primer composition of embodiment 5, wherein at least one epoxy resin is in the form of a solid particulate.
7. The primer composition of embodiment 6, wherein the solid particulate has a number average diameter of from 0.3 micrometers to 100 micrometers.
8. The primer composition of embodiment 7, wherein the solid particulate has a number average diameter of from 0.4 micrometers to 50 micrometers.
9. The primer composition of embodiment 8, wherein the solid particulate has a number average diameter of from 0.5 micrometers to 10 micrometers.
10. The primer composition of any one of embodiments 1-9, wherein the second curative comprises one or more of isophthaloyl dihydrazide, adipic acid dihydrazide, and dicyandiamide.
11. The primer composition of embodiment 10, wherein the second curative is present in an amount of from 0.01 wt % to 20 wt %, based on the overall solids weight of the primer composition.
12. The primer composition of embodiment 11, wherein the second curative is present in an amount of from 0.1 wt % to 15 wt %, based on the overall solids weight of the primer composition.
13. The primer composition of embodiment 12, wherein the second curative is present in an amount of from 1 wt % to 10 wt %, based on the overall solids weight of the primer composition.
14. The primer composition of any one of embodiments 10-13, wherein the second curative comprises a blend of isophthaloyl dihydrazide and dicyandiamide.
15. The primer composition of any one of embodiments 1-14, wherein the first curative comprises one or more of 2,2-bis-[4-(4-aminophenoxy)-phenyl]propane, 2,2'-diaminodiphenyl sulfone, and 4,4'-diaminodiphenyl sulfone.
16. The primer composition of embodiment 15, wherein the first curative comprises 2,2-bis-[4-(4-aminophenoxy)-phenyl]propane.

17. The primer composition of embodiment 16, wherein the 2,2-bis-[4-(4-aminophenoxy)-phenyl]propane is present in an amount of from 0.5 wt % to 40 wt %, based on the solids weight of the primer composition.

18. The primer composition of embodiment 17, wherein the 2,2-bis-[4-(4-aminophenoxy)-phenyl]propane is present in an amount of from 5 wt % to 30 wt %, based on the solids weight of the primer composition.

19. The primer composition of embodiment 18, wherein the 2,2-bis-[4-(4-aminophenoxy)-phenyl]propane is present in an amount of from 10 wt % to 20 wt %, based on the solids weight of the primer composition.

20. The primer composition of any one of embodiments 1-19, wherein the coalescent solvent comprises a glycol mono ether.

21. The primer composition of embodiment 20, wherein the glycol mono ether comprises one or more of propylene glycol mono-ether, ethylene glycol mono-ether, and butylene glycol mono-ether.

22. The primer composition of embodiment 20 or 21, wherein the coalescent solvent is present in an amount of from 0.1 wt % to 30 wt %, based on the overall weight of the primer composition.

23. The primer composition of embodiment 22, wherein the coalescent solvent is present in an amount of from 1 wt % to 20 wt %, based on the overall weight of the primer composition.

24. The primer composition of embodiment 23, wherein the coalescent solvent is present in an amount of from 5 wt % to 10 wt %, based on the overall weight of the primer composition.

25. The primer composition of any one of embodiments 1-24, further comprising a carrier solvent having a flash point of at most 20° C. to at ambient pressure.

26. The primer composition of embodiment 25, wherein the carrier solvent comprises one or more of methyl alcohol, ethyl alcohol, isopropyl alcohol, acetone, methyl ether ketone, methyl propyl ketone, methyl isopropyl ketone, and methyl isobutyl ketone.

27. The primer composition of embodiment 25 or 26, wherein the carrier solvent is present in an amount of from 0.1 wt % to 30 wt %, based on the overall weight of the primer composition.

28. The primer composition of embodiment 27, wherein the carrier solvent is present in an amount of from 0.5 wt % to 15 wt %, based on the overall weight of the primer composition.

29. The primer composition of embodiment 28, wherein the carrier solvent is present in an amount of from 1 wt % to 10 wt %, based on the overall weight of the primer composition.

30. The primer composition of any one of embodiments 1-29, further comprising a corrosion inhibitor comprised of one or more of strontium aluminum polyphosphate hydrate, zinc phosphate, and zinc aluminum polyphosphate hydrate.

31. The primer composition of embodiment 30, wherein the corrosion inhibitor is present in an amount of from 0.1 wt % to 30 wt %, based on the overall solids weight of the primer composition.

32. The primer composition of embodiment 31, wherein the corrosion inhibitor is present in an amount of from 2 wt % to 25 wt %, based on the overall solids weight of the primer composition.

33. The primer composition of embodiment 32, wherein the corrosion inhibitor is present in an amount of from 4 wt % to 20 wt %, based on the overall solids weight of the primer composition.

34. The primer composition of any one of embodiments 1-33, further comprising an inorganic filler.

35. The primer composition of embodiment 34, wherein the inorganic filler comprises fumed silica.

36. The primer composition of embodiment 35, wherein the fumed silica is present in an amount of from 0.01 wt % to 15 wt %, based on the overall solids weight of the primer composition.

37. The primer composition of embodiment 36, wherein the fumed silica is present in an amount of from 0.3 wt % to 10 wt %, based on the overall solids weight of the primer composition.

38. The primer composition of embodiment 37, wherein the fumed silica is present in an amount of from 1 wt % to 5 wt %, based on the overall solids weight of the primer composition.

39. A primer film obtained by curing the primer composition of any one of embodiments 1-38.

40. A primed article obtained by disposing the primer composition of any one of embodiments 1-38 onto a substrate and curing the primer composition.

41. The primed article of embodiment 40, wherein disposing the primer composition onto a substrate comprises spray coating the primer composition.

42. The primed article of embodiment 40 or 41, wherein curing the primer composition comprises thermally curing the primer composition.

43. A method of making a primer composition comprising: milling an aqueous mixture to obtain a precursor dispersion, the aqueous mixture comprising: a thermosetting resin dispersion in water; a coalescent solvent in which the thermosetting resin is at least partially soluble; and a first curative that is substantially water-insoluble; and mixing the precursor dispersion with a second curative that is substantially water-soluble to obtain the primer composition.

44. The method of embodiment 43, wherein the coalescent solvent is a first coalescent solvent and further comprising mixing the precursor dispersion with a second coalescent solvent.

45. The method of embodiment 44, wherein the second coalescent solvent comprises one or more of propylene glycol mono-ether, ethylene glycol mono-ether, and butylene glycol mono-ether.

46. The method of embodiment 44 or 45, wherein the second coalescent solvent is present in an amount of from 0 wt % to 15 wt %, based on the overall weight of the primer composition.

47. The method of embodiment 46, wherein the second coalescent solvent is present in an amount of from 0.05 wt % to 10 wt %, based on the overall weight of the primer composition.

48. The method of embodiment 47, wherein the second coalescent solvent is present in an amount of from 0.1 wt % to 5 wt %, based on the overall weight of the primer composition.

49. The method of any one of embodiments 43-48, further comprising mixing the precursor dispersion with a corrosion inhibitor.

50. The method of embodiment 49, wherein the corrosion inhibitor comprises one or more of strontium aluminum polyphosphate hydrate, zinc phosphate, and zinc aluminum polyphosphate hydrate.

51. The method of embodiment 49 or 50, wherein the corrosion inhibitor is present in an amount of from 0.1 wt % to 30 wt %, based on the overall solids weight of the primer composition.

52. The method of embodiment 51, wherein the corrosion inhibitor is present in an amount of from 2 wt % to 25 wt %, based on the overall solids weight of the primer composition.

53. The method of embodiment 52, wherein the corrosion inhibitor is present in an amount of from 4 wt % to 20 wt %, based on the overall solids weight of the primer composition.

EXAMPLES

Objects and advantages of this disclosure are further illustrated by the following non-limiting examples, but the particular materials and amounts thereof recited in these examples, as well as other conditions and details, should not be construed to unduly limit this disclosure.
The following abbreviations are used to describe the examples:
° C.: degrees Centigrade
° F.: degrees Fahrenheit
cm: centimeter
hrs: hours
kPa: kiloPascals
mil: $10^{-3}$ inch
ml/min: milliliter per minute
mm: millimeter
micrometer
MPa: megaPascal
N: Newton
N/25 mm: Newtons per 25 mm Unless stated otherwise, all other reagents were obtained, or are available from fine chemical vendors such as Sigma-Aldrich Company, St. Louis, Mo., or may be synthesized by known methods. Unless otherwise reported, all ratios are by weight.

Abbreviations for reagents used in the examples are as follows:
ADDH: Adipic acid dihydrazide, available from TCI America, Portland, Oreg.
AF-163: A structural adhesive film, available under the trade designation "SCOTCH-WELD STRUCTURAL ADHESIVE FILM AF-163-2K, 0.06 WEIGHT", from 3M Company, St. Paul, Minn.
ARCOSOLV: Propylene glycol (mono)butyl ether; obtained under the trade designation "ARCOSOLV PNB" from Lyondell Chemical Company, Houston, Tex.
BAPP: 2,2-bis-[4-(4-aminophenoxy)-phenyl]propane, available from TCI America, Portland, Oreg.
BR 6747-1: A water based chromate containing primer, obtained under the trade designation "BR 6747-1" from Cytec Solvay Group, Woodland Park, N.J.
DC-29: A leveling agent, obtained under the trade designation "DOW CORNING 29", obtaining from Dow Corning, Midland, Mich.
CG-1200: A micronized dicyandiamide, available under the trade designation "AMICURE CG-1200", from Air Products and Chemicals Incorporated, Allentown, Pa.
EPZ-3546: A 53 wt. % solids dispersion of "EPON™ RESIN 1007" resin in water and methoxy propanol, obtained under the trade designation "EPI-REZ 3546-WH-53" from Momentive Specialty Chemicals, Columbus, Ohio.
EPZ-5108: A novolac-epoxy dispersion obtained under the trade designation "EPI-REZ DPW-5108" from Momentive Specialty Chemicals.
IPDH: Isophthaloyl dihydrazide, having an amine equivalent weight of 49.2 grams/equivalent, available from TCI America.
IPA: Isopropyl alcohol, from Aldrich.
M5: An untreated fumed silica, obtained under the trade designation "CAB-O-SIL M5" from Cabot Corporation, Tuscola, Ill.
OAKITE 165: A caustic wash solution, obtained under the trade designation "OAKITE 165" from Chemetall, GmbH, Frankfurt am Main, Germany.
PZ-323: 75 wt. % aqueous emulsion of an epoxy phenol novolac resin, obtained under the trade designation "ARALDITE PZ-323" from Huntsman Corporation.
SAPP: A pigment grade strontium aluminum polyphosphate corrosion inhibitor, obtained under the trade designation "HEUCOPHOS SAPP" from Heubach GmbH, Langelsheim, Germany.
TDI: A micronized grade of an aromatic substituted urea, available under the trade designation "Amicure UR-2T", from Air Products and Chemicals Incorporated.
WSA-9911: An aqueous solution of aminopropylsilsesquioxane, obtained under the trade designation "WSA-9911" from available from Gelest, Inc., Morrisville, Pa.
Z-6040: Bifunctional silane containing a glycidoxy reactive group and a trimethoxy-silyl inorganic group, obtained from Dow Corning, Midland, Mich.
ZAPP: A pigment grade zinc aluminum polyphosphate corrosion inhibitor, obtained under the trade designation "HEUCOPHOS ZAPP" from Heubach GmbH.

BAPP-Epoxy-Water Dispersion

A solid curative-epoxy pre-milled dispersion was prepared as follows. 5.0 grams M5 was homogeneously dispersed in a mixture of 78.3 grams PZ-323, 302.3 grams EPZ-3546 and 30.7 grams EPZ-5108 by means of a high speed mixer operating at between 1,000-2,000 rpm for approximately 2-4 minutes at 25° C. With the mixer continuing to run at 300-500 rpm, 55.3 grams BAPP solid was blended into the dispersion, followed by 100 grams distilled water and 0.32 gram of Dow Corning 29, and mixing continued until homogeneous. The milling was conducted in MiniCer Laboratory Mill (Netzsch, Exton Pa.) with 0.5 mm yttria-stabilized zirconia milling media at 250 ml/min flow rate and 4,320 rpm.

Particle size was measured using a Partica LA-950 Laser Diffraction Particle Size Distribution Analyzer (Horiba, Irvine Calif.). The median (also referred to as D50) is the particle diameter at 50% of the cumulative distribution, while D90 is the particle diameter at 90% of the cumulative distribution.

Particle size analysis results are below:

| Median (μm) | D90 (μm) | Mean (μm) | SD (μm) |
|---|---|---|---|
| 2.189 | 3.641 | 2.744 | 7.761 |

BAPP-Water Dispersion 80 g of BAPP was dispersed into 360 g water and then milled. The milling was conducted in the MiniCer Laboratory Mill with 0.5 mm yttria stabilized zirconia milling media operating at a 250 ml/min flow rate and 4,320 rpm. Particle size was measured using a Partica LA-950 Laser Diffraction Particle Size Distribution Analyzer as above.

After milling for 3 minutes, the dispersion thickened up, then prevented further filtration as flow completely stopped. 400 g water was then added into the mill hopper to flush out the rest of samples. The final BAPP concentration was approximately 10%.

Particle size analysis results are below:

| Median (μm) | D90 (μm) | Mean (μm) | SD (μm) |
| --- | --- | --- | --- |
| 10.191 | 15.419 | 10.660 | 3.623 |

Water Based Primer Formulations

Example 1

11.2 grams SAPP, 2.8 grams ZAPP were blended into 172 grams of the BAPP-epoxy pre-milled dispersion by means of a high speed mixer operating at between 1,000-2,000 rpm for approximately 2-4 minutes at 25° C. With the mixer running, 11.4 grams IPA, 3.1 grams acetone and 0.93 grams ARCOSOLV were slowly added, in 3-5 minute intervals. After 5 minutes, 143 grams water was added, followed by 1.5 grams TDI, 1.04 gram IPDH, 0.96 grams CG-1200 and 2.0 grams WSA 9911. Mixing continued for another 15 minutes.

Examples 2-3

The procedure as generally described in Example 1 was repeated, according to the compositions listed in Table 1.

Comparative Examples 1-2

The procedure as generally described in Example 1 was repeated, according to the compositions listed in Table 1.

TABLE 1

| | Composition (grams) | | | | |
| --- | --- | --- | --- | --- | --- |
| Component | Example 1 | Example 2 | Example 3 | Comparative A | Comparative B |
| Water | 143 | 150 | 140 | 110 | 95 |
| IPDH | 1.04 | 0.94 | 0.94 | 0 | 0 |
| CG-1200 | 0.98 | 0.86 | 0.86 | 4.95 | 0 |
| ADDH | 0 | 0 | 0 | 0.89 | 0 |
| PZ-323 | 0 | 5.88 | 5.88 | 30.55 | 23.1 |
| EPZ-3546 | 0 | 22.7 | 22.7 | 118 | 89 |
| CAB-O-SIL M5 | 0 | 0 | 0 | 1.95 | 1.47 |
| BAPP-Epoxy-Water Dispersion | 172 | 135 | 135 | 0 | 0 |
| BAPP-Water Dispersion | 0 | 0 | 0 | 0 | 50 |
| ACROSOLV | 0.93 | 0.93 | 0.93 | 1.21 | 0.91 |
| EPZ-5108 | 0 | 2.3 | 2.3 | 11.96 | 9.03 |
| TDI | 1.5 | 2.5 | 2.5 | 9.09 | 1.66 |
| IPA | 11.4 | 11.4 | 11.4 | 14.8 | 11.8 |
| Acetone | 3.1 | 3.1 | 3.1 | 4.03 | 3.0 |
| SAPP | 11.2 | 11.2 | 11.2 | 11.2 | 11 |
| ZAPP | 2.8 | 2.8 | 2.8 | 2.8 | 2.75 |
| WSA-9911 | 2.0 | 2.0 | 0 | 0 | 0 |
| Z-6040 | 0 | 0 | 2.0 | 1.95 | 1.47 |

Substrate Preparation

Grade 2024T bare aluminum panels were obtained from Erickson Metals of Minnesota, Inc., Coon Rapids, Minn. Prior to bonding with structural adhesive, the panels were prepared by the following surface treatment method.

FPL (Forest Products Laboratory) Etched/Anodized/Primed Panels

The bare aluminum panel was soaked in OAKITE 165 caustic wash solution for 10 minutes at 85° C. The panel was then immersed in tap water for 10 minutes at 21° C., followed by a continuous spray rinsing with tap water for approximately 3 more minutes. The panel was then immersed in an FPL etch solution for 10 minutes at 66° C., after which the panel was spray rinsed with water for approximately 3 minutes at 21° C., allowed to drip dry for another 10 minutes, then dried in an oven for 30 minutes at 54° C. The etched panel was then anodized in a bath of 85% percent phosphoric acid at 72° F. (22.2° C.) for approximately 25 minutes at a voltage of 15 volts and a maximum current of 100 amps, rinsed with water for approximately 3 minutes at 21° C., allowed to drip dry for another 10 minutes, then dried in an oven for 10 minutes at 66° C. Within 24 hours of being anodized, the aluminum panel was sprayed with one of the primer compositions described above, dried at 70° F. (21.1° C.) for 30 minutes, then cured in an oven set at 250° F. (121.1° C.) for 60 minutes. The resulting cured primer thickness was approximately 0.1-0.2 mils (2.5 to 5.1 μm).

Test Methods

The provided primer Examples, along with Comparative BR 6747-1, were evaluated according to one or more of the following tests. With respect to the bonding tests, the samples were subjected to the following cure cycle.

Cure Cycle

The sample was vacuum bagged to a pressure of approximately 28 inches mercury (94.8 kPa) in an autoclave, model number "ECONOCLAVE 3×5", from ASC Process Systems, Sylmar, Calif. Autoclave pressure was increased to 45 psi (310.3 kPa), during which the vacuum bag was vented to the atmosphere once the autoclave pressure surpassed 15 psi (103.4 kPa). Autoclave temperature was then increased at a rate of 4.5° F. (2.5° C.) per minute to 250° F. (121.1° C.). After reaching the set point the sample was held for 60 minutes at this temperature, then cooled at a rate of 5° F. (2.8° C.) per minute to 72° F. (22.2° C.) before releasing the pressure.

Overlap Shear (OSL) Test

The Overlap Shear Test was performed according to ASTM D1002. One liner was removed from a 1-inch (25.4 mm) by ⅝-inch (15.9 mm) wide strip of structural adhesive film and the exposed adhesive manually pressed along the longer edge of a 63 mil (1.60 mm) thick, 4-inch by 7-inch (10.16 cm by 17.78 cm)aluminum test panel. After removing any trapped air bubbles by means of a rubber roller, the opposing liner was removed and another test panel was pressed onto the exposed adhesive, at an overlap of 0.5 inches (12.7 mm). The assembly was then taped together and autoclaved according to one of the cure cycles described above, after which the co-joined panels were cut into seven strips, each measuring 1-inch by 7.5 inches (2.54 by 19.05 cm). The strips were then evaluated for overlap shear strength according to ASTM D-1002, using a tensile strength tester, model "SINTECH 30" from MTS Corporation, Eden Prairie, Minn., at 70° F. (21.1° C.) and a grip separation rate of 0.05 inches/min. (1.27 mm/min.). Six overlap shear test panels were prepared and evaluated per each example. Results are listed in Table 2.

TABLE 2

| Primer Example | Overlap Shear Strength (MPa) | | |
| --- | --- | --- | --- |
| | 70° F. (21.1° C.) | 180° F. (82.2° C.) | 250° F. (121.1° C.) |
| 1 | 44.4 | 32.6 | 11.4 |
| 2 | 42.8 | 34.4 | 20.7 |
| 3 | 44.6 | 33.2 | 17.0 |
| BR 6747-1 | 42.8 | 31.8 | 18.3 |

Floating Roller Peel (FRP) Test

The Floating Roller Peel Test was performed according to ASTM 3167-03. Two test panels, one measuring 63 mils by 8-inches by 3-inches (1.60 mm by 20.32 cm by 7.62 cm), the other measuring 25 mils by 10-inches by 3-inches (0.635 mm by 25.4 cm by 7.62 cm), were bonded together with a structural adhesive and cured in the autoclave, as described in the Overlap Shear Test method. Test strips, 0.5 inches (12.7 mm) wide were cut from the bonded panel assembly and evaluated for floating roller peel strength of the thinner substrate, according to ASTM D-3167-76, using the tensile strength tester. Separation rate was 6 inches/minute (15.24 cm/min) at 70° F. (21.1° C.). Results are listed in Tables 3.

TABLE 3

| Primer Example | FRP (N/25 mm) |
| --- | --- |
| 1 | 308.6 |
| 2 | 274.0 |
| 3 | 272.6 |
| BR 6747-1 | 282.0 |

Salt Corrosion Resistance Test

A primed, Grade 2024T bare aluminum, thickness 0.15-0.25 mil (3.8 to 6.4 μm), was tested in a salt spray chamber in accordance with ASTM B-117. The panels were subjectively evaluated on a scale of 1-5, according to the following ratings:

| Rating | Description |
| --- | --- |
| 1 | No corrosion in either the scribe area or panel area |
| 2 | Corrosion only in the scribe area |
| 3 | Slight corrosion in both scribe and panel area |
| 4 | Moderate corrosion in both scribe and panel area |
| 5 | Significant corrosion in both scribe and panel area |

The results listed in Table 4 show that the water-based Examples performed significantly better than the corrosion resistance performance of the Comparative Examples and the commercially available chromate-based primer, BR 6747-1. Even after 2,000 hours of salt spray exposure, the water-based Examples did not corrode outside of the scribe line.

TABLE 4

| Sample | Salt Corrosion Resistance Rating |
| --- | --- |
| Example 1 | 2 |
| Example 2 | 2 |
| Example 3 | 2 |

TABLE 4-continued

| Sample | Salt Corrosion Resistance Rating |
| --- | --- |
| Comparative A | 4 |
| Comparative B | 4 |
| BR 6747-1 | 3 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A primer composition comprising:
   a thermosetting resin dispersion in water;
   a coalescent solvent in which the thermosetting resin is at least partially soluble;
   a first curative that comprises one or more of 2,2-bis-[4-(4-aminophenoxy)-phenyl]propane, 2,2'-diaminodiphenyl sulfone, and 4,4'-diaminodiphenyl sulfone and present in an amount of from 10 wt % to 40 wt % relative to the overall solids weight of the primer composition; and
   a second curative that comprises a blend of isophthaloyl dihydrazide and dicyandiamide and present in an amount of from 0.5 wt % to 5 wt % relative to the overall solids weight of the primer composition.

2. The primer composition of claim 1, wherein the thermosetting resin comprises an epoxy resin.

3. The primer composition of claim 2, wherein epoxy resin is in the form of a solid particulate.

4. The primer composition of claim 1, wherein the coalescent solvent comprises a glycol mono ether.

5. The primer composition of claim 4, wherein the glycol mono ether comprises one or more of propylene glycol mono-ether, ethylene glycol mono-ether, and butylene glycol mono-ether.

6. The primer composition of claim 1, wherein the coalescent solvent is present in an amount of from 0.1 wt % to 30 wt %, based on the overall weight of the primer composition.

7. The primer composition of claim 6, wherein the coalescent solvent is present in an amount of from 1 wt % to 20 wt %, based on the overall weight of the primer composition.

8. The primer composition of claim 7, wherein the coalescent solvent is present in an amount of from 5 wt % to 10 wt %, based on the overall weight of the primer composition.

9. The primer composition of claim 1, further comprising a carrier solvent having a flash point of at most 20° C. at ambient pressure.

10. The primer composition of claim 9, wherein the carrier solvent comprises one or more of methyl alcohol, ethyl alcohol, isopropyl alcohol, acetone, methyl ether ketone, methyl propyl ketone, methyl isopropyl ketone, and methyl isobutyl ketone.

11. The primer composition of claim 1, further comprising a corrosion inhibitor comprised of one or more of strontium aluminum polyphosphate hydrate, zinc phosphate, and zinc aluminum polyphosphate hydrate.

12. The primer composition of claim 1, further comprising fumed silica.

13. The primer composition of claim 12, wherein the fumed silica is present in an amount of from 0.01 wt % to 15 wt %, based on the overall solids weight of the primer composition.

14. The primer composition of claim 13, wherein the fumed silica is present in an amount of from 0.3 wt % to 10 wt %, based on the overall solids weight of the primer composition.

15. The primer composition of claim 14, wherein the fumed silica is present in an amount of from 1 wt % to 5 wt %, based on the overall solids weight of the primer composition.

16. The primer composition of claim 1, wherein the second curative is present in an amount of from 0.5 wt % to 4 wt %, based on the overall solids weight of the primer composition.

17. The primer composition of claim 16, wherein the second curative is present in an amount of from 1 wt % to 4 wt %, based on the overall solids weight of the primer composition.

18. A primer film obtained by curing the primer composition of claim 1.

19. A primed article obtained by disposing the primer composition of claim 1 onto a substrate and curing the primer composition.

20. A method of making the primer composition of claim 1 comprising:
   milling an aqueous mixture to obtain a precursor dispersion, the aqueous mixture comprising:
      the thermosetting resin dispersion in water;
      the coalescent solvent in which the thermosetting resin is at least partially soluble; and
      the first curative; and
   mixing the precursor dispersion with the second curative to obtain the primer composition of claim 1.

21. The method of claim 20, wherein the coalescent solvent is a first coalescent solvent and further comprising mixing the precursor dispersion with a second coalescent solvent comprising one or more of propylene glycol mono-ether, ethylene glycol mono-ether, and butylene glycol mono-ether.

* * * * *